Figure 1:
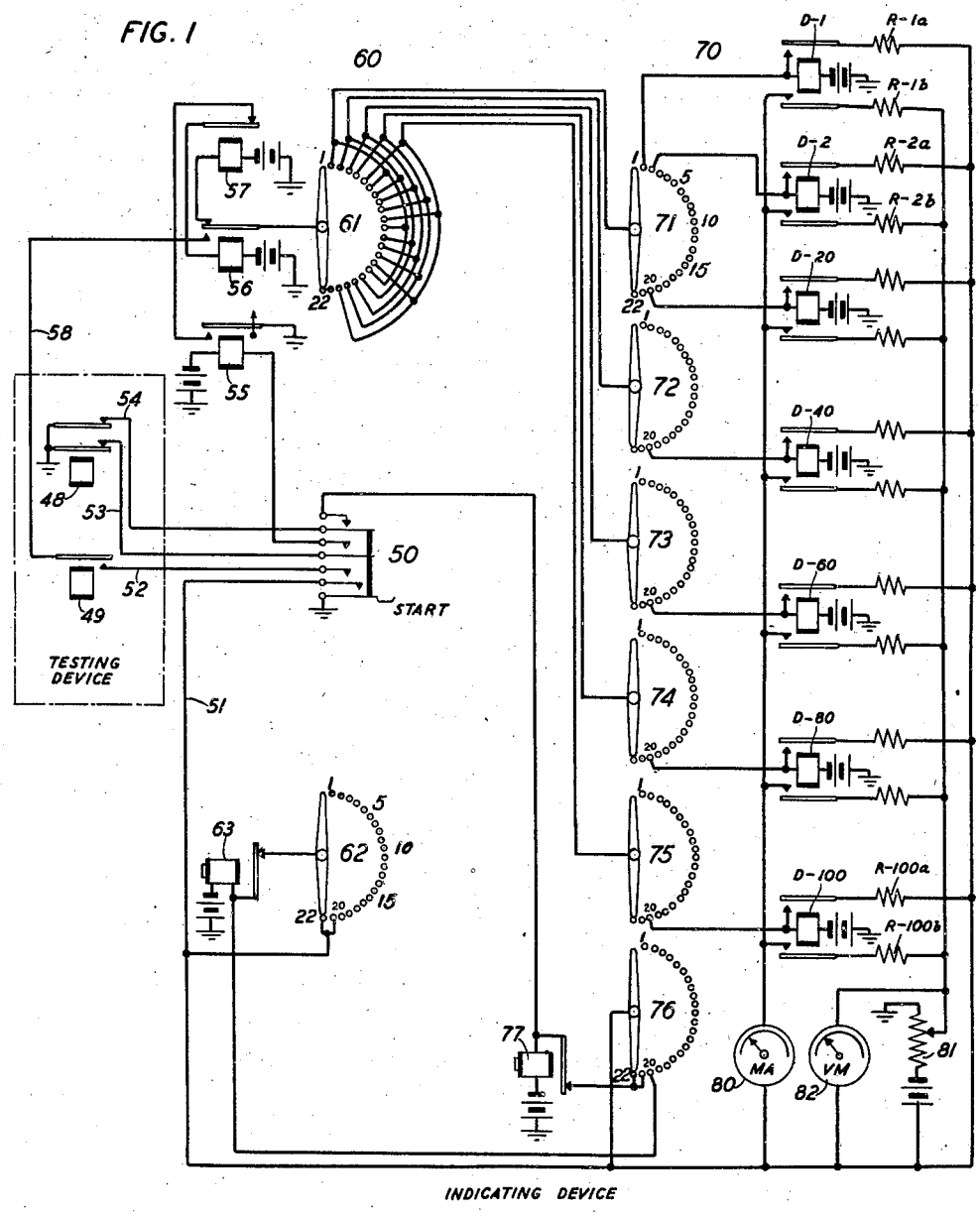

April 29, 1947.  M. B. McDAVITT  2,419,583
TESTING AND INDICATING SYSTEM
Filed Jan. 20, 1945  2 Sheets—Sheet 1

INVENTOR
M. B. McDAVITT
BY
R. O. Covell
ATTORNEY

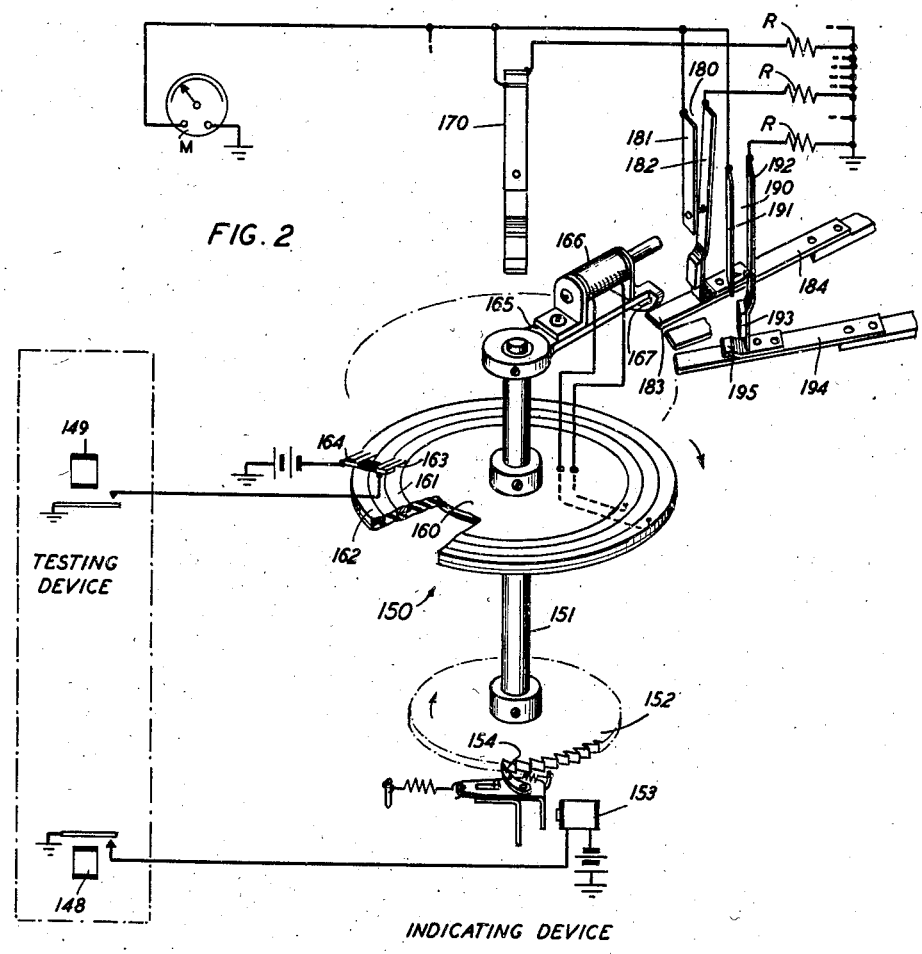

Patented Apr. 29, 1947

2,419,583

UNITED STATES PATENT OFFICE 2,419,583

TESTING AND INDICATING SYSTEM

Marcellus B. McDavitt, Hartsdale, N. Y., assignor to Bell Telephone Laboratories, Incorporated, New York, N. Y., a corporation of New York Application January 20, 1945, Serial No. 573,800

10 Claims. (Cl. 235—92)

This invention relates to testing and indicating or recording systems and has for its object the giving of a continuous indication of the number or percentage of articles, devices or other units found to be in a certain condition in a preceding total number of units tested.

It is, of course, known how to test the condition of articles, devices and other units one after the other and to indicate whenever a tested unit is in a certain condition, for instance, defective or satisfactory; and to record both the total number of units tested and the number of units found to be in the certain condition. The unit being tested may be any article, device, piece of apparatus or equipment and the test may be any desired test, for instance, a test for weight or size, an electrical test such as a test for resistance, inductance or capacitance or a timing test to determine whether certain operations fall within predetermined time limits. There is no limitation as to the type of unit being tested, or the kind of test to be made. Different testing systems to which the invention is applicable are illustrated by the patent to C. Paulson 2,153,989, granted April 11, 1939, which discloses testing apparatus for testing the electrical characteristics of a coil; the patent to H. P. Clauson 1,251,750, granted January 1, 1918 which discloses a testing arrangement for testing switching frames to locate unstandard conditions; the patent to F. B. Anderson 1,904,598, granted April 18, 1933 which discloses a system for testing the insulation leakage resistance of conductors; and the patent to J. E. Ostline 1,674,411, granted June 19, 1928 which discloses traffic recording equipment for telephone systems arranged to test trunks to determine the busy or idle condition of the trunks tested and to record the number of busy trunks in each of a plurality of groups. It may, however, be desirable to know at any time the number of defective units or the percentage of defective units in a certain preceding number of units tested and to have such an indication given continuously. This invention is an indicating or recording arrangement adapted to continuously indicate or record the number or percentage of units in a certain condition within any preceding finite number tested or inspected.

According to one feature of the invention a plurality of condition indicating elements are provided, one for each of a finite number of tests, each element being operated if a certain condition is found to exist in the unit under test and to be locked operated while said finite number of tests are being made, the number of condition indicating elements which are locked operated at any time being indicated by a milliammeter arranged to give a reading proportional to the number operated.

Another feature of the invention is a testing and indicating device comprising a plurality of condition indicating elements cyclically selected one at a time during the testing of articles, devices or other units for operation if the unit then under test is in a certain condition, each operated element being locked, until all the elements of the plurality have been selected for operation, and then released to enable its operation during the testing of the next unit.

The invention and its features will be better understood by considering a testing system arranged in accordance with the invention, two such arrangements being shown schematically in the drawing which forms a part of this specification. The invention is, of course, not limited in its application to the particular arrangements shown in the drawing but is generally applicable to any testing and indicating or recording system in which it is desired to give a continuous indication or record of the number or percentage of units in a given condition out of a preceding finite number of units tested.

The drawing shows schematically in each of its two figures a testing and indicating system embodying the invention.

The system shown in Fig. 1 consists of a testing device and an indicating or recording device. The testing device comprises a relay 48 which is operated once per unit tested and a relay 49 which operates once per defective unit tested. The word sample hereinafter used in this specification means any unit which is being or has been tested. The indicating or recording device comprises a start key 50, two multiposition rotary switches 60 and 70, control relays 55, 56 and 57, condition indicating relays D—1 to D—100, an indicating or recording milliammeter 80 and a voltmeter 82. This indicating or recording device may be associated with any testing arrangement which is adapted to test one sample after another and comprises contact means which operates once per sample tested and contact means which operates once per defective sample tested.

The switches 60 and 70 are of the type disclosed in the patent to A. H. Adams, No. 1,399,728, granted December 13, 1921, each comprising a stepping magnet and a plurality of wipers and wiper banks. The stepping mechanism of these switches is of the type which requires both the operation and the release of the stepping magnet to effect the advance of the wipers from one position to the next. The condition indicating relays D—1 to D—100 are connected to terminals in the banks 71 to 75 of switch 70, twenty relays to each bank; and the brushes of banks 71 to 75 are multiply connected to terminals in the bank 61 of switch 60 whereby the armature of control relay 56 can be connected to the winding of each of relays D—1 to D—100 in succession. While the banks of switches 60 and 70 are shown as having twenty-two terminals each, two of which are not used for connecting with condition indicating relays, it is, of course, understood that all terminals in the banks of switch 70 may be connected to condition indicating relays, that these switches may have any desired number of terminals, that more than two switches might be used or that switching means of any step-by-step type may be provided for establishing connection with each condition indicating relay in succession.

When the indicating device is not being used and the start key 59 is in normal position, switches 60 and 70 may be in any position. If switch 60 is in any one of positions 1 through 20 and switch 70 is in any one of positions 1 through 20, the winding of relay 57 is connected through the back contact of relay 56, wiper 61 and one of brushes 71 to 75 to the winding of one of condition indicating relays D—1 to D—100. All of these relays are normally non-operated since the common locking conductor 51 is not connected to ground until the start key 59 is operated. Each of these relays, when operated, closes a circuit through the associated one of resistors R—1b to R—100b in series with the milliammeter 80 which is calibrated either to indicate the number or the percentage of these relays which are operated. Since a variation in voltage would introduce error in the milliammeter reading, a potentiometer 81 controls the voltage connected in series with the milliammeter and a voltmeter 82 indicates the voltage so that the potentiometer may be adjusted to apply the voltage at which the milliammeter was calibrated.

When the start key 59 is operated, ground is connected to conductors 51 and 52. Assuming switches 60 and 70 to be in positions 21 or 22 at the time that the start key is operated, the connection of ground to conductor 51 effects the operation of stepping magnets 63 and 77 to advance each of switches 60 and 70 into position 1. If relay 48 of the testing device should happen to be normal when key 59 is operated, the stepping magnet 77 would be held operated and switch 70 would not be advanced to position 1 until relay 48 is operated. With switches 60 and 70 in position 1 and the start key 59 operated, a circuit connection is closed from the winding of relay 57 through the back contact of relay 56, wiper and terminal 1 of bank 61, wiper and terminal 1 of bank 71 to the winding of relay D—1. If at this time relay D—1 were locked operated through resistor R—1a and conductor 51, relay 57 would be operatively energized in parallel with relay D—1. The winding of relay 57 is low enough in resistance to constitute a substantial short-circuit across the winding of relay D—1, thereby to effect the release of relay D—1 followed by the release of relay 57. With key 59 operated, a circuit is closed from ground at the outer back contact of relay 48 in the testing device, through conductor 54 and the upper contact of key 59 to energize the winding of stepping magnet 77. Another circuit is closed from ground through the inner back contact of relay 48 of the testing device, conductor 53 and a front contact of key 59 for energizing the winding of relay 55. Relay 55 closes a circuit including a back contact of relay 57 for operating relay 56; and the operation of relay 56 disconnects the winding of relay 57 from the wiper of bank 61 and connects this wiper to conductor 58. If, at the time relay 55 operates, relay 49 of the testing device is operated because the unit then under test is defective the operation of relay 56 closes a circuit from ground through front contacts of start key 59, conductor 52, front contact of relay 49 of the testing device, conductor 58, front contact of relay 56, wiper and terminal 1 of bank 61 of switch 60, wiper and terminal 1 of bank 71 of switch 70 and the winding of relay D—1, thereby operating relay D—1. If, however, the sample being tested is not defective, relay 49 is not operated and therefore relay D—1 is not operated. When operated, relay D—1 locks through its upper contact and resistor R—1a to grounded conductor 51.

When relay 48 of the testing device operates at the end of the testing of the first sample, ground is disconnected from conductors 53 and 54 thereby causing the release of stepping magnet 77 and the release of relay 55. The release of stepping magnet 77 causes the advance of the wipers of switch 70 to position 2; and the release of relay 55 causes the release of relay 56, thereby connecting the winding of relay 57 through the wiper and terminal 1 of bank 61 and the wiper and terminal 2 of bank 71 to the winding of relay D—2 so as to effect the release of relay D—2 if operated at the time that the wipers of switch 70 are advanced to the second position. When relay 48 of the testing device releases, relay 55 is again operated and the stepping magnet 77 of switch 70 is again energized. With relay 55 operated and relay 57 not operated, relay 56 operates to connect the winding of relay D—2 to conductor 58; and, if relay 49 has operated due to the sample under test being defective, relay D—2 operates and locks through resistor R—1a and conductor 51.

When relay 48 of the testing device operates at the end of the testing of the second sample, ground is disconnected from conductors 53 and 54, releasing relay 55 and stepping magnet 77 thereby to advance the wipers of switch 70 to position 3. Thus the testing of each sample in succession and operation of relay 48, causes switch 70 to be advanced step-by-step to connect each of relays D—1 through D—20 to the winding of relay 57 to be released; and the operation of relay 56 connects each of relays D—1 through D—20 to conductor 58 for operation if the sample being tested is defective. When wiper 76 engages terminal 20, a circuit is closed for operating stepping magnet 63 of switch 60; and when wiper 76 is advanced to terminal 21, the release of stepping magnet 63 advances the wipers of switch 60 to position 2 in which position the wiper of bank 61 is connected to wiper 72 of switch 70. The operation of relay 48, at the end of the testing of the twentieth sample, releases stepping magnet 77 to advance the wipers of switch 70 to position 21. Before relay 48 is re-operated, stepping magnet 77 is alternately operated and released to again advance the wipers of switch 70 to position 1, the interrupter contact of the stepping magnet being included in its operating circuit in series with the wiper and terminals 21 and 22 of bank 76.

With switch 60 in position 2 and switch 70 in position 1, relays D—21 through D—40 are connected in succession to conductor 58, while each of the next twenty samples is being tested in like manner to that in which relays D—1 through D—20 were connected to this conductor thereby to effect the operation and locking of any relay in case the sample being tested is defective. When wiper 76 is advanced to position 20, the stepping magnet 63 is again operated; and, when wiper 76 is advanced to position 21, the release of stepping magnet 63 advances the wipers of switch 60 to position 3 in which wiper 61 is connected to wiper 73 of switch 70. The wipers of switch 70 are again advanced to position 1 and relays D—41 through D—60 are then successively connected to conductor 58 while each of another twenty samples is tested; and any relay so connected while a defective sample is tested operates and locks through conductor 51. The wipers of switch 60 are then advanced to position 4 in which wiper 61 is connected to wiper 74. Switch 70 is then advanced to position 1 and relays D—61 through D—80 are connected in succession to conductor 58 while each of another twenty samples is tested. The wipers of switch 60 are then advanced to position 5 in which wiper 61 is connected to wiper 75. Switch 70 is then advanced to position 1 and relays D—81 through D—100 are connected in succession to conductor 58 while each of another twenty samples is tested. Since each of the first five terminals of bank 61 is multipled to the corresponding one of the second, third and fourth sets of five terminals, the wipers of switch 60 are advanced one step for every twenty samples tested and the successive connection of relays D—1 through D—100 is repeated. When switch 60 is advanced to position 21, stepping magnet 63 is alternately operated and released by actuation of its interrupter contact to advance the wipers to position 1, thereby to continue the cyclic connection of relays D—1 through D—100 as long as start key 50 remains operated.

Thus the milliammeter 80 gives a reading which varies according to the number or percentage of defective samples in the preceding one hundred samples tested. It is not necessary that switches 60 and 70 be in position 1 when the start key is operated. Since the locking circuits of relays D—1 through D—100 are normally open, the reading of meter 80 will not indicate the percentage defective in one hundred samples until one hundred or more samples have been tested after the start key 50 is operated.

As above suggested, it is apparent that any desired number of condition indicating relays may be provided together with the required switching arrangement whereby the number or percentage of samples defective in any preceding desired number of samples tested will be indicated by the reading of a milliammeter.

The system shown in Fig. 2 consists of a testing device comprising a relay 148 which is operated once per sample tested and a relay 149 which is operated once per defective sample tested, and an indicating device comprising a rotary mechanism 160, a plurality of condition indicating sets of contact springs 170, 180, 190, arranged for operation by an electromagnet 166 carried by a non-magnetic arm 165 mounted on the shaft 151 of the rotary mechanism 150, a latching element such as 184 and 194 for each set of contact springs, a resistor R for each set of contact springs, and a milliammeter 180. The rotary mechanism 150 comprises the rotatably mounted shaft 151, the ratchet wheel 152 fixed thereto, a stepping magnet 153, and a driving pawl 154 engaging the ratchet wheel. The stepping magnet is energized by the operation of relay 148 of the testing device each time a different sample is tested, but the switching mechanism is not advanced until testing of the sample is completed as indicated by the release of relay 148 whereupon the release of stepping magnet 153 advances the ratchet wheel one step. The rotary mechanism further comprises a disc 160 fixed to the shaft 151 and having two concentric conducting rings connected to the winding of electromagnet 166. The conducting rings are insulated from each other and separately engaged by brushes 163 and 164, brush 163 being connected in series with a front contact of relay 149 of the testing device so that the electromagnet 166 is energized whenever the sample being tested is defective but is not energized if the sample being tested is not defective.

The advance of the rotary mechanism from one position to the next successively positions the electromagnet 166 in operative relation with each of the sets of condition indicating contact springs. Each of the sets of contact springs includes a magnetic armature, such as armature 193, which is attracted by the electromagnet 166 if energized while positioned in operative relation thereto, the associated latching element being effective to retain an operated set of springs in actuated position after the electromagnet is deenergized or advanced to another set of springs. The latching element 184 associated with contact set 180 is shown in the drawing as holding spring 182 in its operated position, whereas the spring 192 of contact set 190 is shown in normal position with its free end resting behind the latch 195 of the latching element 194. The free end of the arm 165 constitutes a cam 167 which engages the inner end of each of the latching elements just prior to the positioning of the electromagnet 166 in operative relation with the armature of the associated contact set, thereby allowing the movable spring of the set to restore to its normal position. Thus, each set of springs will be in normal position at the time electromagnet 166 is positioned in operative relation with the armature carried by the movable spring and will remain in the normal position unless the electromagnet 166 is energized before it is advanced to the next set of springs. It is apparent, therefore, that with N sets of springs, the number of sets of springs which are actuated at any time is the number of samples found to be defective in the preceding N samples tested. And since each set of springs when actuated connects a like resistor R in series with the meter 180, the reading of the meter is proportional to the number of defective samples in the preceding N samples tested.

It is, of course, apparent that the meter in each arrangement may be either an indicating or a recording meter; and other modifications may be made without departing from the spirit of the invention defined in the following claims.

What is claimed is:

1. In a system for testing units one after the other, means for continuously indicating the number or percentage of units in a certain condition in a preceding predetermined number of units tested, said means comprising said predetermined number of condition indicating elements, switching means for successively and cyclically selecting said elements for operation one at a time during the testing of units, means for actuating any selected element if the unit then being tested is in said certain condition, means for locking each actuated element while each of the other elements is selected, means for effecting the release of an actuated element when selected thereby to prepare said element for actuation if the unit then being tested is in said certain condition, and indicating means controlled by said elements to give a reading proportional to the number of said elements which are actuated.

2. In a system for testing units one at a time in succession, means for continuously indicating the number or percentage of units in a predetermined condition in a preceding predetermined number of units tested, said means comprising said predetermined number of sets of contact springs, means for successively and cyclically selecting each of said sets of contact springs for operation during the testing of units, means for operating a selected set of contact springs if the unit then being tested is in said certain condition, means for locking each operated contact set while each of the other contact sets is being selected in turn, and means controlled by said sets of contact springs to give a reading proportional to the number of said sets which are operated.

3. In a system for testing units one after the other, means for continuously indicating the number or percentage of units in a certain condition in a preceding predetermined number of units tested, said means comprising a plurality of condition indicating relays, means for successively and cyclically connecting said relays, one at a time during the testing of units, for operation if the unit being tested is in said certain condition, means for locking each operated relay while each of the other relays is connected for operation, and indicating means for giving a reading proportional to the number of said relays which are operated.

4. In a system for testing units one after the other, means for continuously indicating the number or percentage of units in a certain condition in a preceding predetermined number of units tested, said means comprising a plurality of condition indicating relays, means for successively and cyclically connecting said relays, one at a time during the testing of units, for operation if the unit being tested is in said certain condition, means for locking each operated relay while each of the other relays is connected for operation, and means comprising a milliammeter controlled by said relays to continuously indicate the number of said relays which are operated.

5. In a system for testing units one after the other, means for continuously indicating the number or percentage of units in a certain condition in a preceding predetermined number of units tested, said means comprising a plurality of condition indicating relays, means for successively and cyclically connecting said relays, one at a time during the testing of units, for operation if the unit being tested is in said certain condition, means for locking each operated relay while each of the other relays is connected for operation, a plurality of like resistors, one for each of said relays, a source of current, and a milliammeter, each of said relays having a contact actuated while the relay is operated to close a circuit including the associated one of said resistors, said milliammeter and said source of current, said meter being thereby energized to give a reading indicative of the number of said relays which are operated.

6. In a system for testing units one after the other, means for continuously indicating the number or percentage of units in a certain condition in a preceding predetermined number of units tested, said means comprising a plurality of condition indicating relays, means for successively and cyclically connecting said relays, one at a time during the testing of units, for operation if the unit being tested is in said certain condition, means for locking each operated relay, means effective to release each locked one of said relays after each of the other of said relays has been connected for operation, and indicating means for giving a reading proportional to the number of said relays which are operated.

7. In a system for testing units one after the other, means for continuously indicating the number or percentage of units in a certain condition in a preceding predetermined number of units tested, said means comprising a plurality of condition indicating relays, means for successively and cyclically connecting said relays, one at a time during the testing of units, for operation if the unit being tested is in said certain condition, means for locking each operated relay while each of the other relays is connected for operation, means effective to release each locked one of said relays after each of the others of said relays has been connected for operation, a plurality of like resistors, one for each of said relays, a source of current, and a milliammeter, each of said relays having a contact actuated while the relay is operated to close a circuit including the associated one of said resistors, said milliammeter and said source of current, said meter being thereby energized to give a reading indicative of the number of said relays which are operated.

8. In a system for testing units one after the other, means for continuously indicating the number or percentage of units in a certain condition in a preceding predetermined number of units tested, said means comprising a plurality of condition indicating relays, means for successively and cyclically connecting said relays, one at a time during the testing of units, for operation if the unit being tested is in said certain condition, means for locking each operated relay while each of the other relays is connected for operation, means connected to each of said relays in succession for effecting the release of a connected relay if operated and for effecting completion of the connection of each of said relays when released for operation if the unit being tested is in said certain condition, and indicating means for giving a reading proportional to the number of said relays which are operated.

9. In a system for testing units one after the other, means for continuously indicating the number or percentage of units in a certain condition in a preceding predetermined number of units tested, said means comprising a plurality of condition indicating relays, means for locking each of said relays when operated, a control relay, means including a transfer relay and switching means for successively and cyclically connecting the winding of said control relay to the winding of each of said condition indicating relays, means for advancing said switching means from one condition indicating relay to the next each time a unit is tested, the winding of said control relay having a low resistance so as to cause the release of each condition indicating relay if operated at the time of its connection to said control relay, means comprising a front contact of a relay which is operated once for each unit tested and a back contact of said control relay for operating said transfer relay thereby to close a circuit for operating the connected one of said condition indicating relays if the unit then being tested is in said certain condition, and means controlled by said condition indicating relays for giving a reading proportional to the number of said condition indicating relays which are operated.

10. In a system for testing units one after the other, means for continuously indicating the number or percentage of units in a certain condition in a preceding predetermined number of units tested, said means comprising a plurality of condition indicating relays, means for locking each of said relays when operated, a control relay, means including a transfer relay and switching means for successively and cyclically connecting the winding of said control relay to the winding of each of said condition indicating relays, means for advancing said switching means from one condition indicating relay to the next each time a unit is tested, the winding of said control relay having a low resistance so as to cause the release of each condition indicating relay if operated at the time of its connection to said control relay, means comprising a front contact of a relay which is operated once for each unit tested and a back contact of said control relay for operating said transfer relay thereby to close a circuit for operating the connected one of said condition indicating relays if the unit then being tested is in said certain condition, a plurality of like resistors, one for each of said relays, a source of current and a milliammeter, each of said relays having a contact actuated while the relay is operated to close a circuit including the associated one of said resistors, said milliammeter and said source of current, said meter being thereby energized to give a reading indicative of the number of said relays which are operated.

MARCELLUS B. McDAVITT.

REFERENCES CITED

The following references are of record in the file of this patent:

UNITED STATES PATENTS

| Number | Name | Date |
|---|---|---|
| 2,219,347 | Thompson | Oct. 29, 1940 |
| 1,281,901 | Bobroff | Oct. 15, 1918 |
| 1,650,247 | Turck | Nov. 22, 1927 |